US012154745B2

(12) United States Patent
Zhou

(10) Patent No.: US 12,154,745 B2
(45) Date of Patent: Nov. 26, 2024

(54) POWER TRANSMISSION SWITCH

(71) Applicant: NATURES GENERATOR INC, Oxnard, CA (US)

(72) Inventor: Xiaofei Zhou, Thousand Oaks, CA (US)

(73) Assignee: NATURES GENERATOR INC, Oxnard, CA (US)

( * ) Notice: Subject to any disclaimer, the term of this patent is extended or adjusted under 35 U.S.C. 154(b) by 108 days.

(21) Appl. No.: 18/098,947

(22) Filed: Jan. 19, 2023

(65) Prior Publication Data

US 2024/0249895 A1 Jul. 25, 2024

(51) Int. Cl.
*H01H 9/26* (2006.01)
*H01H 27/04* (2006.01)

(52) U.S. Cl.
CPC .............. *H01H 9/26* (2013.01); *H01H 27/04* (2013.01)

(58) Field of Classification Search
CPC ............ H01H 9/26; H01H 27/04; H01H 9/20; H01H 13/72; H01H 27/00; H01H 3/00; H01H 3/02; H01H 3/54
USPC ...................................... 200/5 B, 50.32, 333
See application file for complete search history.

(56) References Cited

U.S. PATENT DOCUMENTS

| | | | | |
|---|---|---|---|---|
| 8,927,888 B2 * | 1/2015 | Reid | H01H 71/1018 200/50.32 | |
| 9,275,808 B2 * | 3/2016 | Reid | H01H 9/26 | |
| 2014/0332356 A1 * | 11/2014 | Kolberg | H01H 9/26 200/50.32 | |

* cited by examiner

*Primary Examiner* — Lheiren Mae A Caroc
(74) *Attorney, Agent, or Firm* — Daniel M. Cohn; Howard M. Cohn

(57) ABSTRACT

A power transmission switch includes a switch key for controlling a power supply to convert an output state. The switch key is provided with two adjacently arranged slots; and the slots are used for plug-in cooperation with a plug-in sheet. The plug-in sheet is used for plug-in cooperation with two switch keys arranged side by side respectively, so that the two switch keys realize linkage control. The plug-in sheet has respectively plug-in cooperation with the two switch keys arranged side by side to enable the two switch keys to realize linkage control, and thus a power transmission switch is provided to facilitate the linkage control of the two switches.

8 Claims, 4 Drawing Sheets

POWER TRANSMISSION SWITCH

TECHNICAL FIELD

The present invention relates to the field of switch linkages, and more particularly to a power transmission switch.

BACKGROUND ART

In the prior art, a power transmission switch is an electronic component for controlling power conversion. The power conversion device needs to perform control conversion by the power transmission switch to realize the output of different power supply voltages. However, the conventional power transmission switch is mostly provided in a single setting and cannot realize linkage control.

Therefore, how to provide a power transmission switch so as to facilitate the linkage control of the switch becomes an urgent technical problem to be solved.

SUMMARY OF THE INVENTION

The technical problem to be solved by the present invention is how to provide a power transmission switch so as to facilitate the linkage control of the switch.

To this end, according to a first aspect, an embodiment of the invention discloses a power transmission switch, comprising: a switch key for controlling a power supply to convert an output state, wherein the switch key is provided with two adjacently arranged slots; and the slots are used for plug-in cooperation with a plug-in sheet which is used for plug-in cooperation with two switch keys arranged side by side respectively, so that the two switch keys realize linkage control.

The present invention further provides that a notch of the slot penetrates both side walls adjacent to the switch key:

The invention further provides that the slot has a rectangular cross-section.

The present invention further provides that the switch key is provided with a toggle slot.

The present invention further provides that the number of the toggle slots is set to two, and two of the toggle slots are oppositely disposed.

The present invention further provides that a side wall of the switch key is provided with a rotation protrusion for facilitating rotation of the switch key.

The present invention further provides that the rotation protrusion and the switch key are a molded structure.

The present invention further provides that the switch key and the plug-in sheet are made of plastic material.

The present invention has the following advantageous effects. The plug-in sheet has respectively plug-in cooperation with the two switch keys arranged side by side to enable the two switch keys to realize linkage control, and thus a power transmission switch is provided to facilitate the linkage control of the two switches.

BRIEF DESCRIPTION OF THE DRAWINGS

In order that the detailed description of the invention or the prior art may be more clearly understood, a brief description should be made to the drawings that are required to be used in the detailed description or the prior art. It is obvious that the drawings in the description below are some embodiments of the present invention, and other drawings can be obtained by a person skilled in the art without involving any inventive effort.

Figure 1:
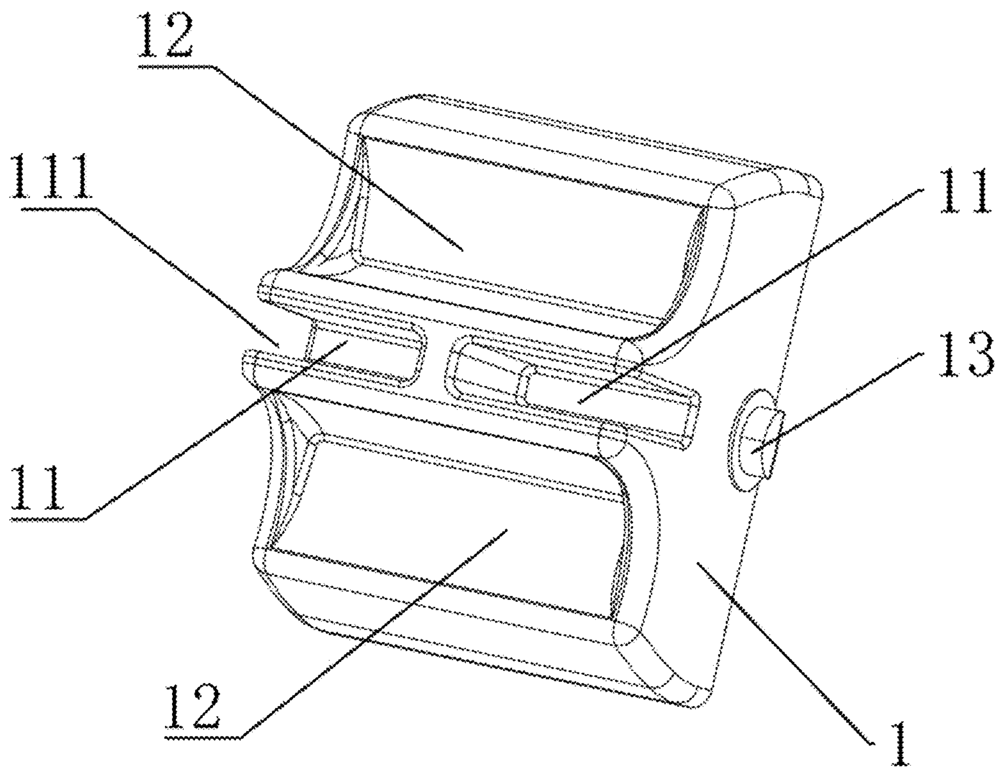
FIG. 1 is a schematic diagram I showing a three-dimensional structure of a power transmission switch according to the embodiment.

Reference numerals: 1, switch key; 2, plug-in sheet; 11, slot; 12, toggle slot; 13, rotation protrusion; 14, mounting slot; 15, protruding strip.

DETAILED DESCRIPTION OF THE INVENTION

In order that the objects, aspects and advantages of the present invention will become more apparent, a more particular description of the invention will be rendered by reference to the appended drawings and embodiments. It should be understood that the particular embodiments described herein are illustrative only and are not limiting for the invention.

In the description of the present invention, it should be noted that, unless expressly specified or limited otherwise, the terms “mounted”, “connecting”, and “connected” are to be interpreted broadly, e.g., fixedly, detachably, or integrally connected; mechanically connected or electrically connected; directly connected or indirectly connected by an intermediate medium; or connected within two elements, and connected by wireless or wired manners. The specific meaning of the above terms in this invention will be understood in specific circumstances by those of ordinary skill in the art.

In describing the present invention, it should be noted that the terms “central”, “upper”, “lower”, “left”, “right”, “vertical”, “horizontal”, “inner”, “outer” and the like are based on the directional or positional relationships shown in the drawings. It is merely for the purpose of describing the present invention and simplifying the description, and is not intended to indicate or imply that a particular orientation, configuration and operation of the referenced device or element is required and should not be construed as limiting the scope of the present invention. Furthermore, the terms “first”, “second”, and “third” are used for descriptive purposes only and are not to be construed as indicating or implying relative importance.

Furthermore, the technical features involved in the different embodiments of the present invention described below can be combined with each other as long as they do not conflict with each other.

An embodiment of the present invention discloses a power transmission switch, as shown in FIGS. 1-4, including: a switch key 1 for controlling a power supply to convert an output state. The switch key 1 is provided with two adjacently arranged slots 11. The slots 11 are used for plug-in cooperation with a plug-in sheet 2 which is used for plug-in cooperation with two switch keys 1 arranged side by side respectively, so that the two switch keys 1 realize linkage control. In the specific implementation, a single switch key 1 can control the output of a 110V power supply. The output of a 240V power supply can be controlled by controlling two switch keys 1 by linkage. In the process of implementation, the plug-in sheet 2 is provided with a plug-in portion for plug-in cooperation with the slot 11. The plug-in part is inserted into the slot 11, so that the plug-in sheet 2 and the two switch keys 1 form an integral structure, thereby realizing the linkage control of the two switches.

It should be noted that the plug-in sheet 2 has respectively plug-in cooperation with the two switch keys 1 arranged side by side to enable the two switch keys 1 to realize linkage control, and thus a power transmission switch is provided to facilitate the linkage control of the two switches.

As shown in FIG. 1, each of the slots 11 defines a notch 111, and each notch 111 penetrates one side wall of the switch key 1. It should be noted that since each notch 111 penetrates one side wall of the switch key 1, the plug-in sheet 2 is easily inserted into the slots 11. Then the two switch keys 1 are synchronously moved via the connection of the plug-in sheet 2, thereby achieving the linkage control of the two switch keys 1.

As shown in FIG. 1, the slots 11 are rectangular in cross-section. In the specific implementation, the inner bottom surface of the slot 11 may be arranged in a circular arc shape. The cross section of the slot 11 may also be arranged in a square shape.

As shown in FIG. 1, the switch key 1 is provided with a toggle slot 12. It should be noted that the provision of the toggle slot 12 facilitates the accommodation of a user's finger, and further facilitates the user to toggle the switch key 1 so as to realize the back-and-forth switching of multiple control gears, which is easy to operate.

As shown in FIG. 1, the number of toggle slots 12 is set to two, and the two toggle slots 12 are oppositely disposed. In the specific implementation process, the slot 11 is located between two toggle slots 12. By providing two toggle slots 12, it is convenient for a user to toggle the switch key 1 so as to realize the back-and-forth switching of multiple control gears. The operation is simple.

Figure 2:
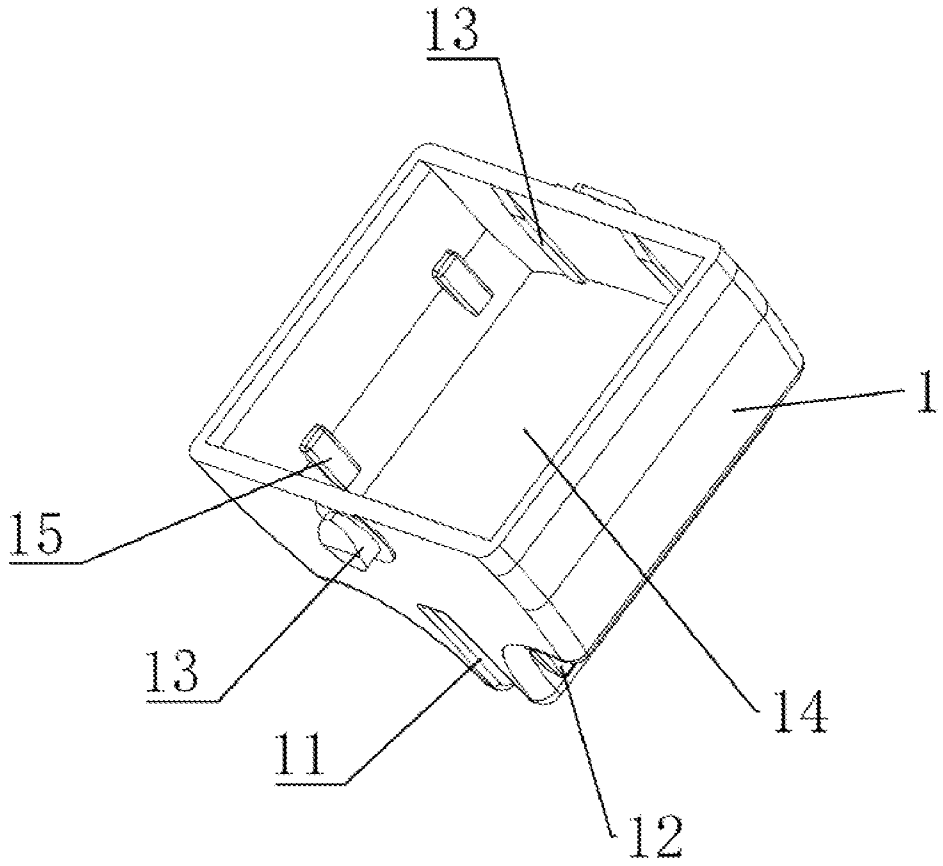
FIG. 2 is a schematic diagram II showing a three-dimensional structure of a power transmission switch according to the embodiment.
Figure 3:
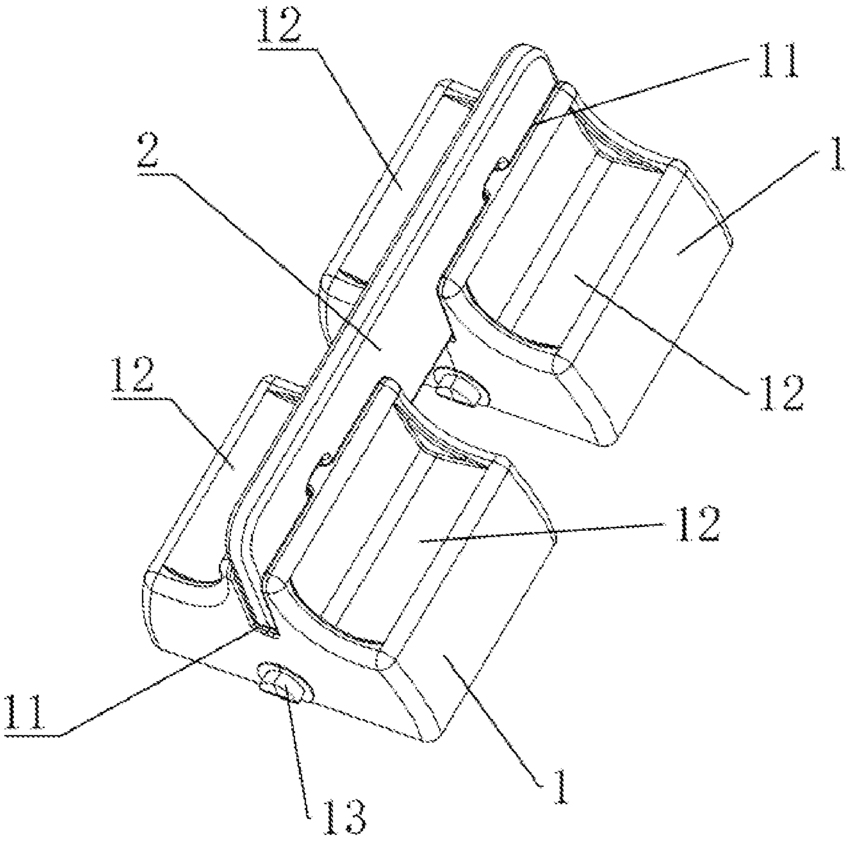
FIG. 3 is a schematic diagram of a linkage control application of a power transmission switch according to the embodiment.
Figure 4:
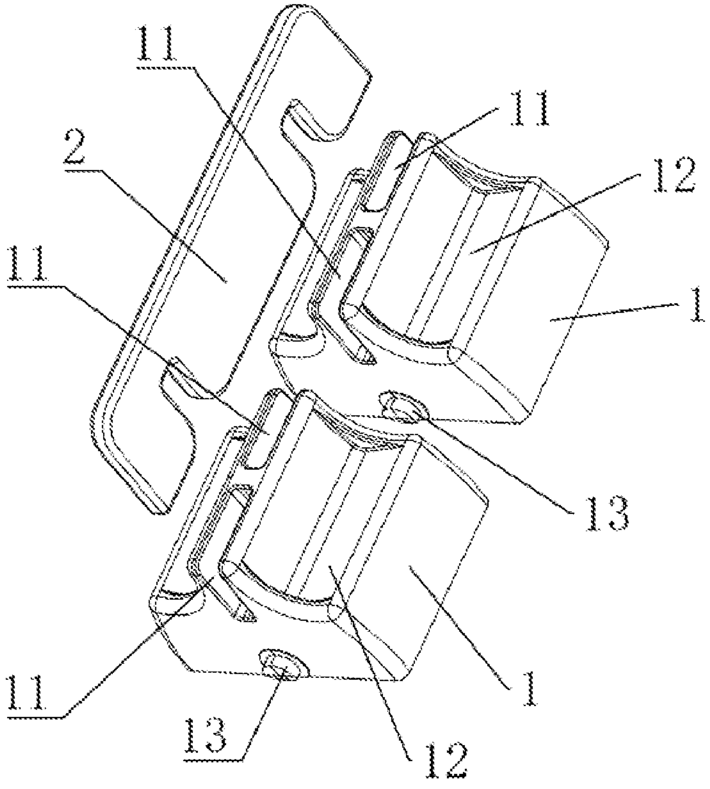
FIG. 4 is a schematic diagram of an explosion structure of a power transmission switch linkage control according to the embodiment.

As shown in FIGS. 1 and 2, a side wall of the switch key 1 is provided with a rotation protrusion 13 for facilitating rotation of the switch key 1. It should be noted that the rotation protrusion 13 has a rotation function. When a user toggles the toggle slot 12, the switch key 1 is conveniently driven to rotate by the arrangement of the rotation protrusion 13, thereby conveniently realizing the back-and-forth switching of multiple control gears. The operation is simple.

As shown in FIGS. 1 and 2, the rotation protrusion 13 and the switch key 1 are a molded structure. Note that, since the rotation protrusion 13 and the switch key 1 are a molded structure, the structure of the power transmission switch is more stable.

As shown in FIGS. 1-4, the switch key 1 and the plug-in sheet 2 are made of plastic material. Note that both the switch key 1 and the plug-in sheet 2 are integrally formed by injection molding.

As shown in FIGS. 1 and 2, the switch key 1 is provided with a mounting slot 14 for facilitating the mounting of the switch key 1. One end wall surface of the mounting slot 14 is arranged in an arc shape. The side wall of the mounting slot 14 is provided with several protruding strips 15. It should be noted that the mounting slot 14 serves a mounting function to facilitate the mounting of the switch key 1. The arrangement of the protruding strip 15 facilitates the positioning and mounting of the switch key 1. The mounting is more stable.

Working principle. The plug-in sheet 2 has respectively plug-in cooperation with the two switch keys 1 arranged side by side to enable the two switch keys 1 to realize linkage control, and thus a power transmission switch is provided to facilitate the linkage control of the two switches.

It should be understood that the above-described embodiments are merely illustrative for clarity and are not restrictive of the embodiments. It will be apparent to those skilled in the art that various other modifications and variations can be made in the present invention on the basis of the above mentioned. It is not necessary and cannot be exhaustive of all modes of implementation. The obvious change or alteration arising therefrom is still within the scope of protection of the invention.

The invention claimed is:

1. A power transmission switch, comprising: a switch key (1) for controlling a power supply to convert an output state, wherein the switch key (1) is provided with two adjacently arranged slots (11); and the slots (11) are used for plug-in cooperation with a plug-in sheet (2) which is used for plug-in cooperation with two switch keys (1) arranged side by side respectively, so that the two switch keys (1) realize linkage control.

2. The power transmission switch according to claim 1, wherein each of the slots (11) defines a notch (111), and each notch (111) penetrates one side wall of the switch key (1).

3. The power transmission switch according to claim 1, wherein the slots (11) have a rectangular cross-section.

4. The power transmission switch according to claim 1, wherein the switch key (1) is provided with toggle slots (12).

5. The power transmission switch according to claim 4, wherein a number of the toggle slots (12) is set to two, and the two toggle slots (12) are oppositely disposed.

6. The power transmission switch according to claim 1, wherein a side wall of the switch key (1) is provided with a rotation protrusion (13) for facilitating rotation of the switch key (1).

7. The power transmission switch according to claim 6, wherein the rotation protrusion (13) and the switch key (1) are a molded structure.

8. The power transmission switch according to claim 1, wherein the switch key (1) and the plug-in sheet (2) are made of plastic material.

* * * * *